United States Patent [19]

Kohout

[11] Patent Number: 4,666,106
[45] Date of Patent: May 19, 1987

[54] AIRCRAFT DOOR LOCKING DEVICE

[76] Inventor: J. Michael Kohout, 5 S. Lewis St., Metter, Ga. 30439

[21] Appl. No.: 803,009

[22] Filed: Nov. 29, 1985

[51] Int. Cl.⁴ .............................................. B64C 1/14
[52] U.S. Cl. ......................... 244/129.3; 70/DIG. 65; 70/14; 70/94; 292/150; 292/DIG. 21
[58] Field of Search ............... 244/129.3, 129.4, 1 R; 49/61, 65, 67; 292/DIG. 21, 71, 150, 238, 288; 70/91, 101, 94, 14, DIG. 65

[56] References Cited

U.S. PATENT DOCUMENTS

| | | | |
|---|---|---|---|
| 1,168,107 | 1/1916 | Oldham | 70/14 |
| 1,478,552 | 12/1923 | Chapman | 70/DIG. 65 |
| 1,685,998 | 10/1928 | Hagstrom | 292/71 |
| 1,688,187 | 10/1928 | Jackson et al. | 70/101 |
| 1,724,424 | 8/1929 | Sandholdt, Jr. | 70/DIG. 65 |
| 3,190,090 | 6/1965 | Zaidener | 70/238 |

FOREIGN PATENT DOCUMENTS 2024307 1/1980 United Kingdom ................. 70/238

Primary Examiner—Galen Barefoot
Attorney, Agent, or Firm—Jones & Askew

[57] ABSTRACT

A device for securing an opposing pair of outwardly opening cabin doors on general aviation aircraft and the like. A pair of non-extensible elongated elements, such as a pair of rods or a rod and a cable, are joined together at one end such that the elements can rotate independently of one another. The opposite ends of the elements are secured to the cabin doors, at least one of the elements being selectively engagable to its corresponding door from outside the aircraft. With the device in place, the cabin doors are clamped together and cannot be opened until at least one of the elements is disengaged from its corresponding door.

16 Claims, 9 Drawing Figures

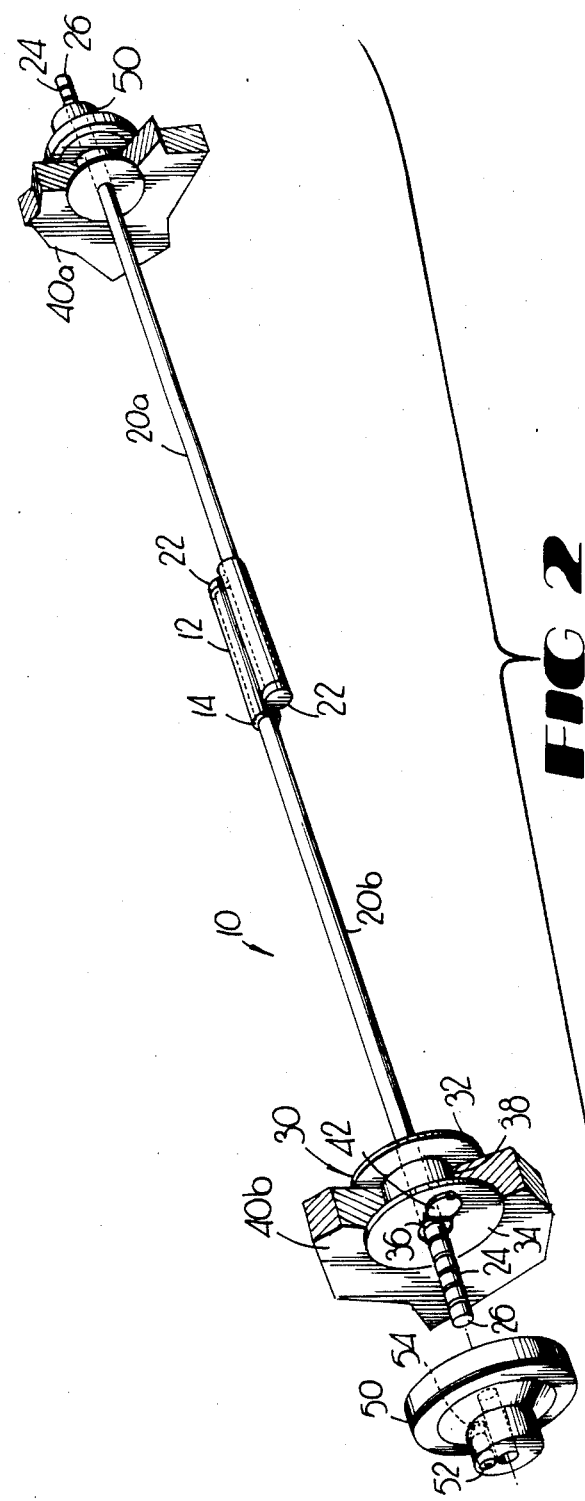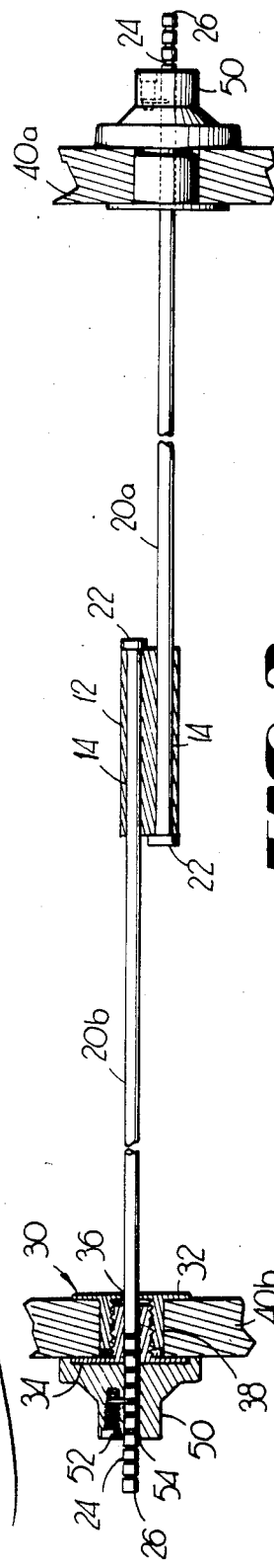

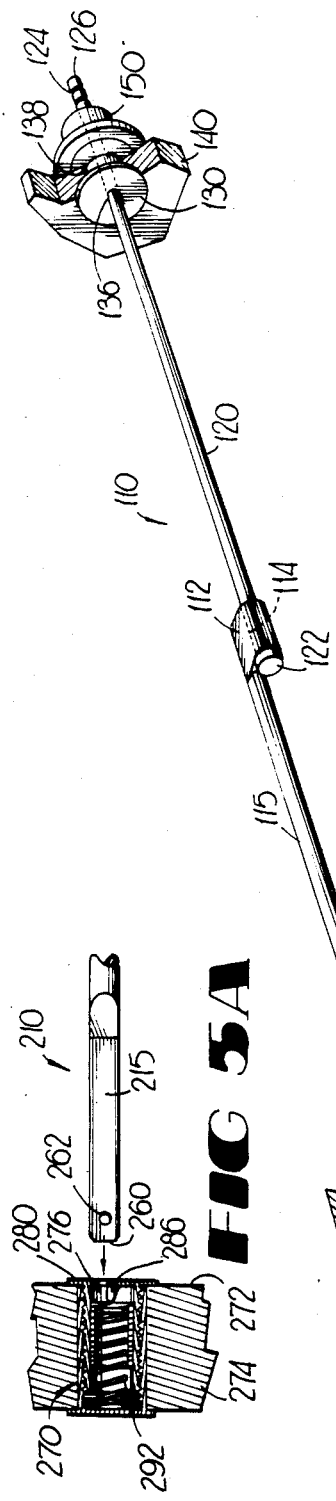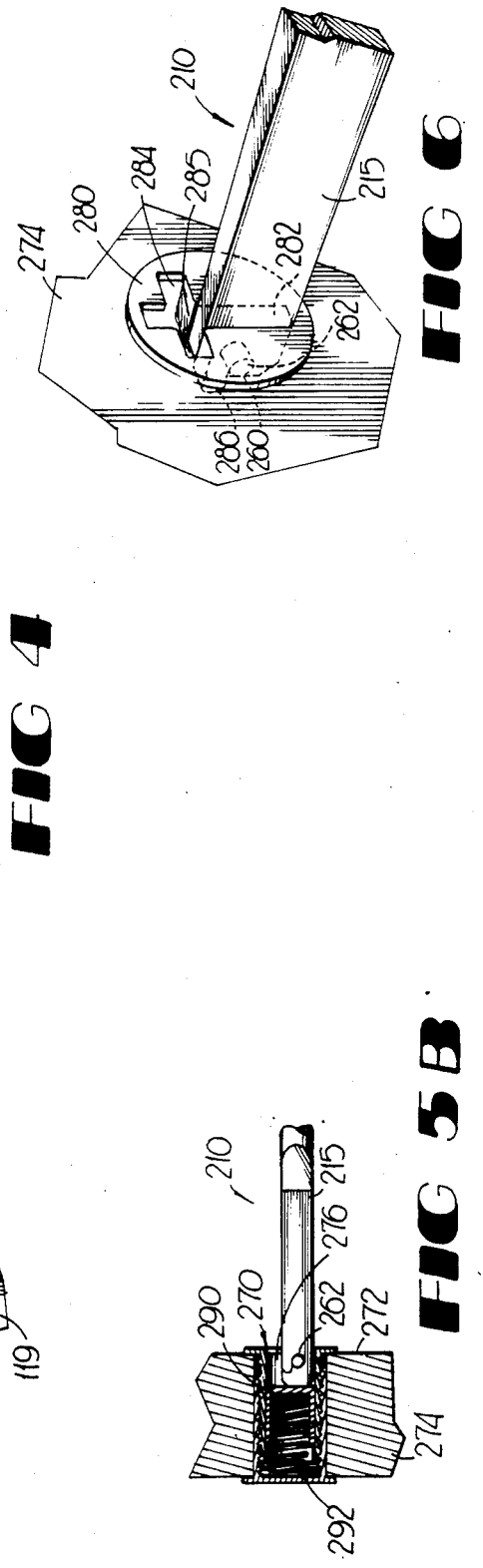

4,666,106

AIRCRAFT DOOR LOCKING DEVICE

TECHNICAL FIELD

This invention relates generally to door locking devices, and relates more specifically to a device for securing an opposing pair of outwardly opening cabin doors on general aviation aircraft and the like and thus preventing the theft or vandalism of the aircraft and its contents.

BACKGROUND OF THE INVENTION

General aviation aircraft often sit unattended for extended periods of time. Because such aircraft are often equipped with expensive avionics, these unattended aircraft are an inviting target for vandals and thieves. The door locks provided as standard equipment on many general aviation aircraft are largely ineffective against even amateur thieves and can be opened with a simple screwdriver in a matter of moments. Accordingly, there is a need to provide a locking device for general aviation aircraft which can be installed on new aircraft or easily retrofitted to existing aircraft, to secure the aircraft cabin and its contents against unauthorized entry.

SUMMARY OF THE INVENTION

As will be seen, the aircraft door locking device of the present invention provides a simple yet effective means for securing the cabin doors of general aviation aircraft. Stated generally, the aircraft door locking device of the present invention comprises a means for clamping together opposing outwardly opening cabin doors or to clamp a single outwardly opening door to a fixed opposite wall, to prevent the doors from being opened so long as the door locking device is in place. The device can easily be retrofitted to existing aircraft and is inexpensive to manufacture. When not in use, the door locking device is detachable and disassembles for easy storage.

Stated somewhat more specifically, a first embodiment of the door locking device of the present invention includes a collar defining a pair of parallel cylindrical holes. Two hardened steel rods each having a flange at one end and notches cut into the other end are inserted through the holes in the collar from opposite ends. The rods are extended until the flanges at the ends of the rods abut the collar, preventing the rods from becoming disengaged from the collar. The notched ends of the rods are then inserted through holes formed in each opposing aircraft door. Cam locking devices are inserted over the ends of the rods which protrude outwardly from the aircraft doors. The cam locks are then actuated so that the cams engage the notches in the rods. The cam locks prevent the rods from being retracted through the holes in the aircraft doors such that the opposing aircraft doors are clamped together and cannot be opened until the cam locks are removed. If a potential intruder attempts to wrench the cam lock off, the rod will spin freely inside the collar, preventing the trespasser from bringing sufficient leverage to bear on the cam lock to dislodge it.

A second embodiment of the aircraft door locking device includes a first steel rod having a collar with a longitudinal hole formed therein attached to one end of the rod. The opposite end of the rod is releasably mounted to the interior surface of one aircraft door. A second steel rod having notches formed in one end and a flange at the other end is inserted through the hole in the collar to extend across the cabin to the opposite aircraft door, the flange on the end of the second rod abutting the collar and preventing the second rod from becoming disengaged therefrom. The notched end of the second rod is inserted through a hole in the second door, and a cam lock device is attached to the end of the second rod from outside the aircraft as described above. Once installed, the first rod is inaccessible from outside the aircraft, and the second rod is free to spin inside the collar to prevent the cam lock from being wrenched off.

A third embodiment of the aircraft door locking device is very similar to the second embodiment but includes a different means for releasably mounting the first rod to the interior surface of one aircraft door.

A fourth embodiment of the aircraft door locking device includes a cable releasably mounted by means of a fitting to the interior surface of one aircraft door. A rod at the opposite end of the cable is inserted through a hole in the opposite aircraft door. A cam lock device is attached to the end of the rod from outside the aircraft as described above. A swivel mount between the cable and the rod permits the rod to rotate freely with respect to the cable, thereby preventing a trespasser from bringing sufficient leverage to bear on the cam lock to dislodge it. This fourth embodiment provides the additional advantages of compact storage by simply coiling the cable, without having to disassemble the device into its its component parts.

Thus, it is an object of the present invention to provide a door locking device for securing general aviation aircraft against unauthorized entry.

It is a further object of the present invention to provide a door locking device for general aviation aircraft which is inexpensive to manufacuture, simple to operate, and reliable.

It is another object of the present invention to provide a door locking device which can easily be retrofitted to existing aircraft.

It is a further object of the present invention to provide a door locking device which cannot be wrenched off from outside the aircraft.

Other objects, features, and advantages of the present invention will become apparent upon reading the following specification, when taken into conjunction with the claims and the accompanying drawings.

BRIEF DESCRIPTION OF THE DRAWINGS

FIG. 2 is a pictorial view of the aircraft door lock shown in FIG. 1.

FIG. 3 is a side plan view of the aircraft door lock of FIG. 1.

FIG. 4 is a pictorial view of a second embodiment of the aircraft door lock of the present invention.

FIG. 5A is a side view of the end of a rod of a third embodiment of the aircraft door lock with the door socket cut away to reveal interior detail.

FIG. 5B is a side view of the end of the rod FIG. 5A inserted into the door socket.

FIG. 6 is a pictorial view of the aircraft door lock of FIG. 5B.

DETAILED DESCRIPTION OF THE DISCLOSED EMBODIMENT

Figure 1:
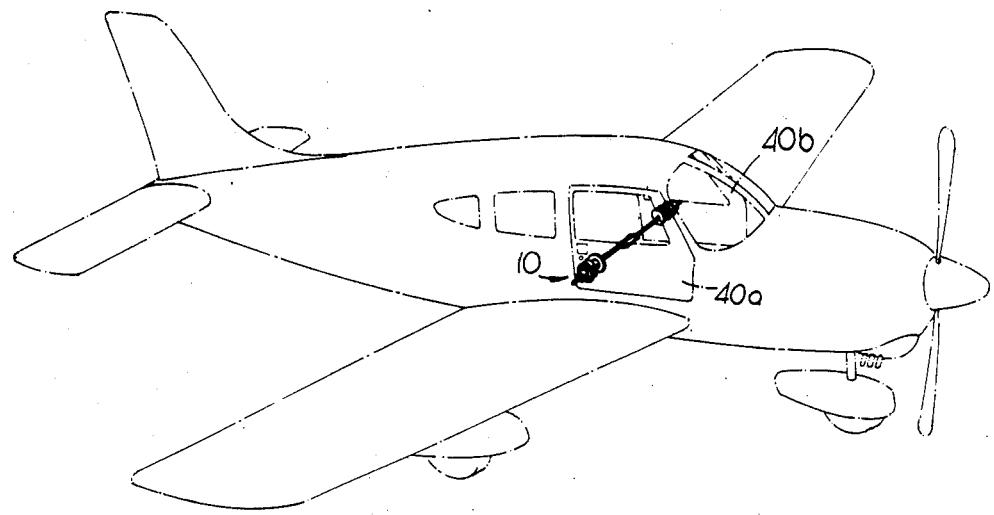
FIG. 1 is a pictorial view of a first embodiment of the aircraft door lock of the present invention as installed on a typical general aviation aircraft.

Referring now in more detail to the drawings, in which like numerals indicate like elements throughout the several views, FIGS. 1-3 show a first embodiment of an aircraft door locking device 10 according to the present invention. The door locking device 10 includes an elongated collar 12 having a pair of parallel cylindrical holes 14 formed longitudinally therein.

The door locking device 10 further includes a pair of rods 20a, 20b formed of hardened steel or other appropriate material. Each rod 20a, 20b has a flange 22 at one end therof and notches 24 in the other end 26. The notched ends 26 of the rods 20a, 20b are inserted through the holes 14 in the collar 12 from opposite ends, as shown in FIGS. 2 and 3, and extended until the flanges 22 on the opposite ends of the rods 20a, 20b abut the collar 12. A grommet 30 consisting of inner and outer matingly threaded halves 32, 34 and having an axial hole 36 formed therein is installed into each of two corresponding holes 38, one in each opposing aircraft door 40a, 40b. A hinged flap 42 on the outside of the face of the grommet 30 normally covers the axial hole 36 in the grommet when the lock 10 is not installed.

The notched end 26 of the rod 20a is inserted through the axial hole 36 in the grommet 30 in one aircraft door 40a. Similarly, the notched end 26 of the rod 20b is inserted through the axial hole 36 in the grommet 30 in the opposite aircraft door 40b. In this manner, the notched ends 26 of the rods 20a, 20b protrude exteriorly of the aircraft doors 40a, 40b. Cam locking devices 50 are inserted over the protruding notched ends 26 of the rods 20a, 20b. The cam locks 50 include lock cylinders 52 actuated by a key (not shown) to turn cams 54. With the cam locks 50 inserted over the notched ends 26 of the rods 20a, 20b the cams 54 can engage the notches 24 in the rods to prevent the rods from being drawn back through the axial holes 36 in the grommets 30. In this manner, the opposing aircraft cabin doors 40a, 40b are clamped together and cannot be opened until at least one of the cam locks 50 is removed from the rods 20a, 20b.

To use the aircraft door locking device 10 of the present invention, one cabin door 40a is preferably closed while the operator engages the locking device 10 from outside the aircraft through the open opposite door 40b. The notched ends 26 of the rods 20a, 20b are inserted through the collar 12 from opposite directions and the rods are fully extended until the flanges 22 on the opposite ends of the rods 20a, 20b bear against the collar 12. From inside the aircraft, the notched end 26 of one rod 20a is inserted through the axial hole 36 in the grommet 30 in the closed door 40a so that the notched end of the rod 20a protrudes through the door 40a. A cam lock 50 is installed over the notched end 26 of the first rod 20a from outside the aircraft, and the lock actuated to engage the notches 24 in the rod 20a to prevent the rod from being drawn back through the hole 36 in the grommet 30. The opposite door 40b is then partially closed sufficient to feed the notched end 26 of the second rod 20b through the hole in the door 40b, and the door is then closed the remaining way so that the notched end 26 of the second rod 20b protrudes through the closed second door 40b. A second cam lock 50 is installed over the end 26 of the second rod 20b and actuated to engage the cam with one of the notches 24.

When installed in this manner, the opposing cabin doors 40a, 40b are clamped together by the door locking device 10 in such a manner that it is impossible to open either of the doors outwardly without first removing at least one of the cam locks 50. Furthermore, because each of the rods 20a, 20b spins freely inside the holes 14 in the collar 12, a potential intruder who attempts to wrench the cam locks 50 off the rods will succeed only in rotating the cam lock and rod, making it impossible for the intruder to bring enough leverage to bear on the cam lock to dislodge it.

To further impede an intruder from wrenching the cam locks 50 off of the rods 20a, 20b, it will be appreciated that the cam locks should fit snugly against the outer surfaces of the aircraft doors, and that the shortest possible seciton of the rods remain exposed. If desired, minor adjustments in the overall length of the locking apparatus 10, and hence in the length of the exposed sections of rods which protrude outwardly of the aircraft, can be effected by interposing shims or washers between the flanges 22 and the collar 12.

To disengage the aircraft door locking device 10 of the present invention, the cam locks 50 are first unlocked and removed from the notched ends 26 of the rods 20a, 20b. The cabin doors 40a, 40b can now be opened, drawing the notched ends 26 of the rods 20a, 20b back through the axial holes 36 in the grommets 30 in the process. The rods 20a, 20b can then be retracted back through the holes 14 in the collar 12 for storage.

A second embodiment 110 of the aircraft door locking device of the present invention is shown in FIG. 4. A collar 112 having having a single cylindrical hole 114 formed longitudinally therein is permanently attached to one end of a first hardened steel rod 115. Helical threads 116 are formed in the opposite end 117 of the first rod 115. A threaded receptacle 118 mounted to the interior surface of one cabin door 119 threadingly receives the threaded end 117 of the first steel rod 115.

A second steel rod 120 has a flange 122 formed at one end thereof and a plurality of notches 124 in the opposite end 126 similar to rods 20a, 20b of the first embodiment 10 of the door locking device. The notched end 126 of the second steel rod 120 is inserted through the hole 114 in the collar 112 to extend outwardly from the collar in the direction opposite the first steel rod 115. A grommet 130 having a longitudinal hole 136 formed therein is installed in a hole 138 in the opposite cabin door 140. The notched end 126 of the second steel rod 120 is received through the axial hole 136 in the grommet 130 so that the end of the rod 120 protrudes outwardly from the aircraft door 140. A cam locking device 150 having a cam actuated by a lock cylinder similar to the cam locking device 50 of the first embodiment 10, mounts on the notched end 126 of the second rod 120. The cam lock can be actuated to engage a cam (not shown, but similar to the cam 54 of the cam lock 50 of the first embodiment 10) with the notches 124 formed in the end 126 of the rod 120.

To install the aircraft door locking device 110 of the second embodiment, the first cabin door 119 upon which interior surface the threaded receptacle 118 is mounted is closed. The notched end 126 of the second rod 120 is inserted through the hole 114 in the collar 112 to project from the collar in the direction opposite the first rod 115 and fully extended until the flange 122 on the end of the second rod bears against the collar. The threaded end 117 of the first rod 115 is screwed into the threaded receptacle 118, thereby securing the first rod to the cabin door 119. The opposite cabin door 140 is then partially closed until the threaded end 126 of the second rod 120 can be inserted through the hole 136 in the grommet 130. The door 140 is then completely closed, so that the threaded end 126 of the second rod 120 protrudes outwardly from the outer surface of the door. The cam locking device 150 is then inerted over the notched end 126 of the second rod 120 and actuated so that the cam engages one of the notches 124 in the end of the rod. In this manner, the opposing cabin doors 119, 140 are clamped together such that neither can be opened outwardly until the cam lock 150 is removed so that the second rod 120 can be drawn back through the hole 136 in the grommet 130 in the cabin door 140.

To unlock the door locking device 110 of the second embodiment, the cam lock 150 is first removed from the notched end 126 of the second rod 120, thereby permitting the end of the rod to be drawn back through the hole 136 in the grommet 130 in the cabin door 140. The cabin door 140 is then opened, and the first rod 115 unscrewed from the threaded receptacle 118 on the inside surface of the opposite door 119. The second rod 120 can then be retracted through the hole 114 in the collar 112 for compact storage. The threaded receptacle 118 remains permanently mounted to the inner surface of the cabin door 119.

As with the first embodiment of the invention, the rod 120 upon which the cam lock device 150 is mounted is free to rotate in the hole 114 in the collar 112. Therefore, if anyone should attempt to wrench the cam lock 150 off the rod 120, the cam lock and rod will both rotate, making it impossible to bring sufficient leverage to bear on the cam lock to dislodge it from the end of the rod.

A third embodiment 210 of the aircraft door locking device of the present invention is shown in FIGS. 5A, 5B, and 6. The third embodiment 210 is constructed similar to the second embodiment 110 but incorporates an alternate method for securing the device to the inner surface of the first aircraft door. As can be best seen in FIG. 6, a first steel rod 215 has a generally rectangular cross section at one end 260 thereof. A pair of opposing lobes 262 laterally project from each side of the rod 215 at a point proximate to the end 260. A socket 270 (FIG. 5A) is attached to the inner surface 272 of the aircraft door 274 and has a longitudinal bore 276 formed therein. A faceplate 280 covering the end of the bore 276 and substantially flush with the inner surface 272 of the aircraft door 274 has a longitudinal slot 282 dimensioned to receive the end 260 of the rod 215 but not the lobes 262 projecting laterally therefrom. A lateral slot 284 formed in the faceplate 280 intersects the longitudinal slot 282 at an intersection 285 and is dimensioned to receive the opposing lobes 262 projecting laterally from the rod 215. A detent 286 (FIG. 5A) is formed on the inner surface of the faceplate 280. A follower 290 is urged toward the detent 286 by a coil spring 292.

To attach the rod 215 to the inner surface 272 of the aircraft door 274, the end 260 of the rod is inserted into the longitudinal slot 282 in the faceplate 280 of socket 270. The lobes 262 on either side of the rod 215 are received through the lateral slot 284 in the face plate 280. As the rod 215 is inserted into the socket 270, the end 260 of the rod depresses the follower 290, compressing the spring 292. The rod 215 is then pressed downwardly within the longitudinal slot 282 in the faceplate 280 of the socket 270, so that the lobes 262 on either side of the rod are aligned with the detent 286. As the rod 215 is released, the coil spring 292 presses the follower 290 against the end 260 of the rod, pushing the rod outwardly until the lobes 262 engage the detent 286. The end of the rod 215 is thus prevented from becoming disengaged from the socket 270 by the lobes 262 projecting laterally from either side of the rod, which lobes can only pass back through the face plate 280 through the lateral slot 284, which action is prevented by the follower 290 and spring 292 maintaining the end of the rod within the detent 286.

To disengage the rod 215 from the aircraft door 274, the rod 215 is pushed inwardly, the end 260 of the rod 215 bearing against the follower 290 and compressing the spring 292. When the rod 215 has been sufficiently depressed to disengage the lobes 262 from the detent 286, the rod is lifted upwardly within the longitudinal slot 282 in the faceplate 280 of the socket 270. The rod 215 can now be retracted, the lobes 262 being withdrawn through the lateral slot 284 in the faceplate 280.

Figure 7:
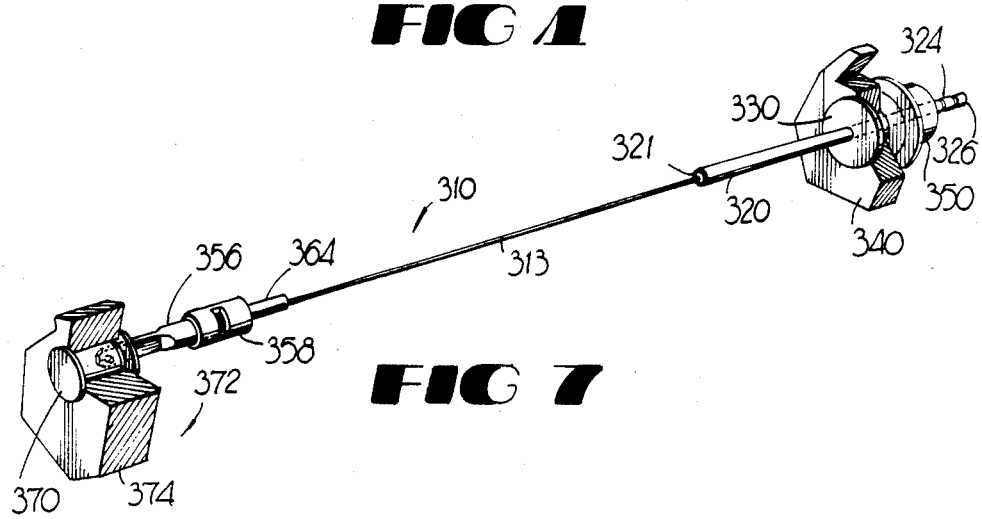
FIG. 7 is a pictorial view of a fourth embodiment of an aircraft door lock according to the present invention.
Figure 8:
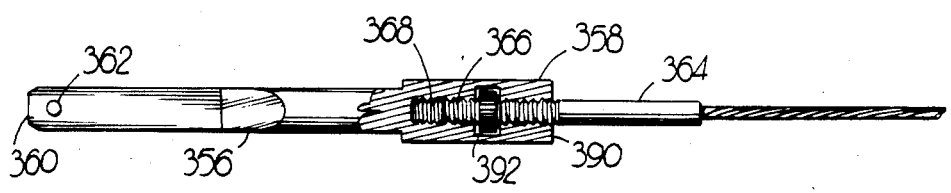
FIG. 8 is a partial cut-away side view of the aircraft door lock of FIG. 7.

A fourth embodiment of an aircraft door lock 310 according to the present invention is shown in FIGS. 7 and 8. One end of a steel cable 313 is attached to a rod 320 by means of a swivel device 321 which permits the rod to rotate freely with respect to the cable. The rod 320 includes notches 324 formed in the opposite end 326 thereof. It will be understood that this construction of the rod 320 approximate to the notched end 326 is similar to the design of the rods 20a, 20b and 120 of the previously described embodiments, and that the rod 320 interrelates with a grommet 330 installed in the aircraft cabin door 340 and with a cam locking device 350 in the manner hereinabove described.

The opposite end of the cable 313 is attached to one end of a fitting 356 by means of a cable adjusting device 358. The opposite end 360 of the fitting 356 has a generally rectangular cross section. A pair of opposing lobes 362 protrude from either side of the fitting 356 proximate to the end 360. It will be understood that the elements of the fitting 356 proximate to the end 360 are of a similar design to the rod 215 in the third embodiment discussed above, and that the fitting 356 can be attached to a socket 370 on the inner surface 372 of an aircraft door 374 in the same manner hereinabove described for the rod 215 of the third embodiment 210.

At best seen in FIG. 8, the cable adjusting device 358 includes a shaft 364 having threads 366 formed in one end thereof, the other end thereof being attached to the cable 313. The threaded end of the shaft 364 is received in a threaded bore 368 formed in one end 390 of the fitting 356. A thumb wheel 392 can be turned to draw the threaded shaft 364 into or out of the threaded bore 368 in the manner well known to those skilled in the art to adjust the overall length of the locking device 310.

To install the locking device 310 of the fourth embodiment, the end 360 of the fitting 356 is inserted into the socket 370 in the manner hereinbefore described for the third embodiment. With the fitting 356 securely attached to the inner face 372 of the door 374, the cable 313 is extended across the aircraft cabin so that the notched end 326 of the rod 320 can be inserted through the grommet 330 in the opposing aircraft door 340. The knurled knob 392 of the cable adjusting device 358 can be rotated to shorten or lengthen the aircraft door lock 310 as desired. A cam locking device 350 is installed over the portion of the rod 320 protruding outwardly from the aircraft door 340 and actuated to engage the notches 324 in the rod. In this manner, the opposing aircraft doors 340, 374 are clamped together by the device 310 and cannot be opened until the cam lock 350 is removed. If a potential intruder should try to wrench the cam lock 350 off of the rod 320, the rod is free to rotate relative to the cable 313 by means of the swivel mount 321, thereby preventing sufficient leverage to be brought to bear on the cam lock to disengage it.

To disengage the fourth embodiment of the aircraft door lock, the cam lock 350 is removed from the end of the rod 320, permitting the rod to be retracted through the grommet 330 in the aircraft door 340. The fitting 356 can be disengaged from the opposite door 374 in the manner hereinabove described for the third embodiment. It will be appreciated that, when the aircraft door locking device 310 is disengaged, the fitting 356 and the rod 320 remain attached to the cable 313 as a single component, simplifying storage.

With all of the above-described embodiments of the locking device of the present invention, when the device is used with a high-wing aircraft, the placement of the wing will serve to shelter the exposed parts from rain. However, when the door locking device is used with a low-wing aircraft, it may be necessary to install a tightly fitting rubber gasket in the hole in the grommet mounted in the aircraft door to prevent rain from entering the cabin through the hole. Also, when the door lock is removed and stored for flight, it may be desirable to plug the hole in the grommet with a screw-type cap to present drafts and wind noise during flight, which cap can be easily removed when it is desired to install the door locking device. When such aircraft door lock is used on a pressurized aircraft, it will be necessary for the cap to be installed in an airtight manner.

It will be appreciated by those skilled in the art that a door lock of the above-described constructions can be used on aircraft having opposing outwardly opening doors, on aircraft which have a single outwardly opening door and a fixed wall on the opposite side of the cabin, or as a cargo compartment hatch lock. It will be further appreciated that the aircraft door lock of the present invention can be easily adapted to aircraft of various widths by providing rods or cables of the appropriate longer or shorter dimensions.

Finally, it will be understood that the preferred embodiment of the present invention has been disclosed by way of example, and that other modifications may occur to those skilled in the art without departing from the scope and spirit of the appended claims.

What is claimed is:

1. An apparatus for closely securing outwardly-opening opposing first and second doors of an aircraft or the like, comprising:
    a first non-extensible elongated element having first and second ends;
    a second non-extensible elongated element having first and second ends;
    means for joining together said first ends of said first and second elongated elements, said first and second elongated elements being dimensioned when so joined to extend from said first door to said second door;
    means for releasably securing said second end of said first elongated element to said first door; and
    means securable and releasable from outside said aircraft for releasably securing said second end of said second elongated element to said second door, whereby said opposing aircraft doors can be releasably clamped together from outside said aircraft to prevent outward opening to protect said aircraft form unauthorized entry.

2. The apparatus of claim 1, wherein said means for joining said first ends of said first and second elongated elements together comprises means for releasably joining said first ends of said first and second elongated elements together, whereby said first and second elongated elements are selectively disengagable for storage when not in use.

3. The apparatus of claim 1, wherein said means for joining said first ends of said first and second elongated elements together allows said first and second elongated elements to rotate independently of one another.

4. The apparatus of claim 1, wherein said first and second non-extensible members comprise first and second rods having flanges at said first ends thereof, and wherein said means for releasably joining said first ends of said first and second rods together comprises a collar defining two bores therethrough being dimensioned to receive said rods but not said flanges, whereby said second ends of said first and second rods are inserted through said bores from opposite directions until said flanges at said first ends of said rods abut said collar.

5. The apparatus of claim 4, wherein said means securable and releasable from outside said aircraft for releasably securing said second end of said second elongated element to said second door comprises:
    means defining a hole through said second door dimensioned to receive said second end of said second rod, said second end of said second rod being received through said hole to project outwardly from the outer surface of said second door; and
    lock means for releasably securing to the portion of said second rod proximate to the outer surface of said second door, whereby said second door is prevented from opening outwardly by said lock means bearing against said outer surface of said second door.

6. The apparatus of claim 5, wherein said second rod further includes means defining notches in the portion of said rod projecting outwardly from said outer surface of said second door, and whereby said lock means further includes means for selectively engaging said notches.

7. The apparatus of claim 1, wherein said means for releasably securing said second end of said first elongated element to said first door comprises means securable and releasable from outside said aircraft.

8. The apparatus of claim 1, wherein said means for releasably securing said second end of said first elongated element to said first door comprises means for releasably securing the second end of said first elongated element to the inner surface of said first door.

9. The apparatus of claim 8, wherein said second end of said first elongated element is threaded, and wherein said means for releasably securing said second end of said first elongated element to said inner surface of said first door comprises means mounted on said inner surface of said first door for defining a threaded bore dimensioned to threadingly receive said threaded second end of said first elongated element.

10. The apparatus of claim 8, wherein said first elongated element further includes at least one lobe projecting laterally therefrom proximate to said second end thereof, and wherein said means for releasably securing the second end of said first elongated element to said inner surface of said first door comprises:

means disposed on the inner surface of said first door for defining a bore;

a faceplate covering one end of said bore, said faceplate defining a longitudinal slot therein dimensioned to receive said second end of said first elongated element but not said lobe projecting therefrom for movement within said longitudinal slot along the length thereof, said faceplate further defining a lateral slot intersecting said longitudinal slot at an intersection such that said second end of said first elongated element and said lobe projecting therefrom are receivable through said faceplate at said intersection;

a detent formed interiorly of said bore and proximate to said longitudinal slot to receive said lobe when said second end of said first elongated element and said lobe are inserted through said faceplate at said intersection and said first elongated element is displaced along the length of said longitudinal slot;

a follower disposed for longitudinal reciprocal motion within said bore; and means for urging said follower toward said detent, whereby said follower bears against said second end of said first elongated element to urge said lobe into engagement with said detent.

11. The apparatus of claim 1, wherein said first non-extensible member comprises a cable, and wherein said second non-extensible member comprises a rod.

12. The apparatus of claim 11, wherein said means for joining together said first end of said rod and said first end of said cable includes means for allowing said rod to rotate independently of said cable.

13. The apparatus of claim 11, wherein said means for releasably securing said second end of said cable to said first door comprises:

a fitting having first and second ends, the first end of said fitting being attached to said second end of said cable, and means for releasably securing said second end of said fitting to said first door.

14. The apparatus of claim 13, wherein said cable is attached to said fitting by means of a turnbuckle, whereby the overall length of the apparatus can be adjusted by adjusting said turnbuckle.

15. The apparatus of claim 13, wherein said second end of said fitting comprises a threaded shaft, and wherein said means for releasably securing said second end of said fitting to said first door comprises means disposed on the inner surface of said first door for defining a threaded bore dimensioned to receive said threaded shaft.

16. The apparatus of claim 13, wherein said fitting further includes at least one lobe projecting laterally therefrom proximate to said second end thereof, and wherein said means for releasably securing said second end of said fitting to said inner surface of said first door comprises:

means disposed on said inner surface of said first door for defining a bore;

a faceplate covering one end of said bore, said faceplate defining a longitudinal slot therein dimensioned to receive said second end of said fitting but not said lobe projecting therefrom for movement within said longitudinal slot along the length thereof, said faceplate further difining a lateral slot intersecting said longitudinal slot at an intersection such that said second end of said fitting and said lobe projecting therefrom are receivable through said faceplate at said intersection;

a detent formed interiorly of said bore and proximate to said longitudinal slot to receive said laterally projecting lobe when said second end of said fitting and said lobe are inserted through said faceplate at said intersection of said longitudinal and lateral slots and said fitting is displaced along the length of said longitudinal slot;

a follower disposed for longitudinal reciprocal motion within said bore; and means for urging said follower toward said detent, whereby said follower bears against said second end of said fitting to urge said lobe into engagement with said detent.

* * * * *